Patented Dec. 30, 1930

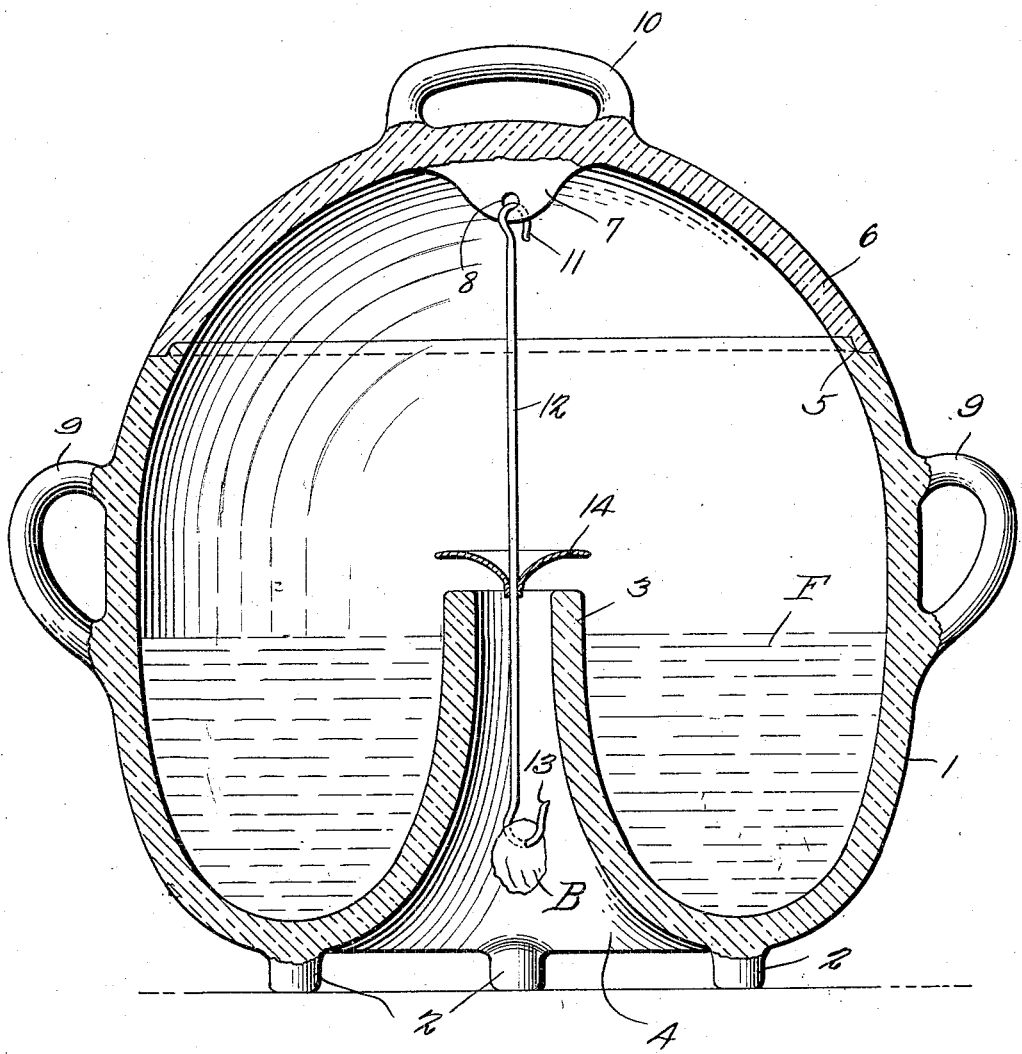

1,786,704

UNITED STATES PATENT OFFICE

STANESLAUS DEIBELE, OF WOODBURN, OREGON

INSECT TRAP

Application filed July 30, 1929. Serial No. 382,153.

This invention relates to a trap for flies and other insects, one of the objects being to provide a simple, compact, and efficient device of this character which can be placed on a table or other supporting structure and, after being baited, will serve to direct the insect into a compartment containing a fluid and from which the insect will not escape.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing, which is a central vertical section through the trap, the preferred form of the invention has been shown.

Referring to the drawing by characters of reference, 1 designates a bowl of glass or other suitable material provided with supporting studs 2 adapted to hold the bottom of the bowl out of contact with a supporting surface. The bottom of the bowl is rounded and merges into an upwardly extending tubular core 3 concentric with the bowl and terminating at its upper end adjacent to the center thereof. This tubular core flares downwardly as shown at 4.

The upper edge of the bowl is formed with a rabbet 5 providing a seat for the lower edge of a dome-like lid 6 and depending from the center of this lid is an ear 7 having an aperture 8.

To facilitate handling of the device handles 9 may be provided on the bowl and another handle 10 may be provided on the lid 6.

A hook 11 extends detachably through the opening 8 and is provided at one end of a rod or wire 12. This wire is of such length as to hang within the tubular core 3 where it is formed with a hook 13 on which suitable bait indicated at B is adapted to be placed.

An inverted flared deflector 14 is carried by the rod and is spaced from but overhangs the upper end of the tubular core 3.

In practice the lid 6 is removed and this will, of course, lift the wire 12 from the bowl. A suitable bait can be placed on the hook 13 and a quantity of water or other fluid insecticide can be placed in the bowl so as to extend around the core 3. Thereafter the wire 12 is lowered to bring the hook 13 and bait B within the core and, when the lid engages its seat, the deflector 14 will overlie the upper end of the core 3.

Flies or other insects attracted by the bait will travel under the bowl between the supporting lugs 2 and thence upwardly to the bait. It is a well-known fact that flies will not travel downwardly through an opening. Consequently the insect, on leaving the bait, will travel upwardly through the core 3 and thence into the bowl through the space beneath the deflector 14. They will thus become trapped and will ultimately fall into the fluid indicated at F.

The entire structure except the bait holding means and deflector can be made of glass and can be cheaply produced. Furthermore it can be made sufficiently ornamental to permit use wherever desired without being objectionable.

What is claimed is:

1. An insect trap including a bowl for holding a liquid, a tubular core opening upwardly into the bowl and downwardly through the bottom thereof, said core being flared downwardly, means for supporting the bottom of the bowl above a supporting surface, a lid removably mounted on the bowl, bait supporting means suspended from the lid and within the core, and a deflector carried by said means and overhanging but spaced from the core.

2. An insect trap including a bowl, means for spacing the bowl from a supporting surface, a tubular core opening upwardly into the bowl and downwardly through the bottom thereof, said core being flared downwardly, a lid removably mounted on the bowl, a member detachably connected to and suspended from the lid, means carried by said member for supporting bait within the core, and a deflector carried by said member and spaced from but overhanging the upper end of the core.

In testimony that I claim the foregoing as my own, I have hereto affixed my signature.

STANESLAUS DEIBELE.